(12) United States Patent
Elias et al.

(10) Patent No.: US 9,943,191 B1
(45) Date of Patent: Apr. 17, 2018

(54) APPARATUS FOR HOLDING AN OBJECT IN A LIQUID BATH

(71) Applicants: John Elias, Madera, CA (US); Carly Overin, Madera, CA (US)

(72) Inventors: John Elias, Madera, CA (US); Carly Overin, Madera, CA (US)

( * ) Notice: Subject to any disclaimer, the term of this patent is extended or adjusted under 35 U.S.C. 154(b) by 0 days.

(21) Appl. No.: 15/369,851

(22) Filed: Dec. 5, 2016

(51) Int. Cl.
*A47J 43/18* (2006.01)
*F16M 13/02* (2006.01)
*F16B 47/00* (2006.01)

(52) U.S. Cl.
CPC .............. *A47J 43/18* (2013.01); *F16B 47/00* (2013.01); *F16M 13/022* (2013.01)

(58) Field of Classification Search
CPC .. A47J 43/18; A47J 47/00; A47J 47/20; A47J 47/16; F16B 47/00; F16M 13/022; F16M 13/02; A63H 3/50; F21V 21/0925; F21V 21/0965; A61J 9/06; A61J 9/0653
USPC .... 248/206.2, 102–107, 205.3, 206.5, 205.5, 248/205.6, 206.3, 206.4; 446/73
See application file for complete search history.

(56) References Cited

U.S. PATENT DOCUMENTS

| | | | |
|---|---|---|---|
| 3,827,571 A | 8/1974 | Koutny | |
| 6,216,887 B1 | 4/2001 | Soo | |
| 6,330,948 B1 * | 12/2001 | Leto | A47J 47/20 |
| | | | 211/65 |
| 6,364,130 B2 * | 4/2002 | Wright | A47L 19/04 |
| | | | 211/184 |
| 8,133,090 B2 * | 3/2012 | Hardin | A63H 3/00 |
| | | | 40/411 |
| 8,240,488 B2 | 8/2012 | Huang | |
| 8,459,599 B2 * | 6/2013 | Du | F16M 11/041 |
| | | | 248/176.3 |
| 8,932,689 B2 * | 1/2015 | Wei | A47G 33/06 |
| | | | 428/18 |
| D751,856 S | 3/2016 | Williams | |
| D764,224 S | 8/2016 | Williams | |
| 9,497,989 B2 | 11/2016 | Williams | |
| 2006/0243685 A1 * | 11/2006 | Monroig | A47K 1/09 |
| | | | 211/65 |
| 2008/0173600 A1 * | 7/2008 | Mungal | A47G 23/02 |
| | | | 211/71.01 |
| 2011/0198462 A1 * | 8/2011 | Pell | A47J 47/16 |
| | | | 248/206.2 |
| 2015/0257409 A1 * | 9/2015 | Wilson | A23G 7/0031 |
| | | | 211/60.1 |

(Continued)

*Primary Examiner* — Nkeisha Smith
(74) *Attorney, Agent, or Firm* — Richard A. Ryan

(57) ABSTRACT

An apparatus for holding a buoyant object in a liquid bath so as to defrost or otherwise process the object with a liquid. The apparatus has a base, one or more surface engaging devices and one or more independently movable elongated flexible arms. The base fits inside a container holding the liquid. The surface engaging devices removably secure the base to a bottom wall of the container. The elongated flexible arms extend upward and outward from the base to hold the object in the liquid bath. In use, the engaging devices secure the base to the bottom wall of the container and the flexible arms are flexibly manipulated to hold the object below the surface of the liquid and away from the bottom wall and sidewalls of the container so as to at least substantially encircle the object with the liquid to more quickly and evenly process the object.

17 Claims, 7 Drawing Sheets

(56) References Cited

U.S. PATENT DOCUMENTS

2016/0167853 A1\* 6/2016 Gallup ................... A47G 29/10
                                                            248/205.2
2016/0327202 A1\* 11/2016 Hoeltge ................. F16M 11/40

\* cited by examiner

US 9,943,191 B1

APPARATUS FOR HOLDING AN OBJECT IN A LIQUID BATH

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses for holding an object in a liquid bath. In particular, the present invention relates to such apparatuses that are utilized to removably hold an object inside a liquid bath in a manner which keeps the object covered by the liquid for defrosting the object and other processing purposes. Even more particularly, the present invention relates to such apparatuses that are removably secured to the bottom of the liquid bath in a manner that allows the liquid to substantially encircle the object.

B. Background

A wide variety of food items are sold in a frozen condition and many people enjoy cooking and eating these foods once they are properly prepared. Although many frozen food items can be directly cooked from a frozen condition, typically by cooking the item in a pot of boiling water, oven or microwave oven, many frozen food items must be thawed before cooking. Although many food items can be thawed by allowing the item to sit for a period of time in a refrigerator, on a counter or in a pan/sink, there are a significant number of food items that are not so easily thawed. In particular, the density of meat food items, some of which can be relatively large in size, often restricts the ability of the food preparer to thaw these food items in the previously described manner. Examples of such food items include, but are not limited to, turkey, game hens, chickens, steak, ground beef and the like. The primary problem with regard to thawing these types of food items in the refrigerator are often time related in that the cold air of the refrigerator can require a significant amount of time to thaw the food item. The primary problem with regard to thawing such food items on a counter or in a pan or sink is that the food item is unlikely, particularly if large in size, to thaw evenly.

A common method of defrosting certain food items is to immerse the food item in a liquid bath, usually comprising water. Immersion of the food item in water is known to reduce the time to thaw the food item, relative to defrosting in a refrigerator or other cool temperature enclosure, and provides a much more even thaw for the food item, relative to defrosting the item on a counter or in a pan or sink (without water). Typically, the home water immersion method of defrosting food items comprises placing the food item in a sink, pot or other open (usually) enclosure, filling the interior chamber of the enclosure with a sufficient amount of water to create a liquid bath that covers the food item and then leaving the food item in the liquid bath until it sufficiently defrosts. As well known to persons who utilize the immersion method of defrosting, most frozen food items have a lower density than the water or other liquid that is being utilized for the liquid bath and, as a result, the food item will rise to the top surface of the liquid. The floating frozen food item creates a problem for the person wanting to defrost the food item in that the food item becomes only partially encircled by the liquid in the enclosure. As a result, the upper surface of the food item, namely that portion of the food item at or above the surface of the liquid, will not thaw at the same rate as the remaining portion of the food item, namely that portion of the food item in the liquid. The uneven thawing of the food item is not preferred or recommended for cooking or eating food items. In addition, in certain conditions, the uneven defrosting could result in the growth of bacteria.

In order to fully immerse the frozen food item in the liquid bath, many people will place a weighted item on top of the food item to counteract the buoyancy of the frozen food item. Unfortunately, while this can result in the food item being positioned fully beneath the surface of the liquid in the liquid bath, the use of a weighted item to accomplish this result creates its own problems. One problem with utilizing a weighted item to "hold down" the food item is that the weighted item itself will cover part of the food item and reduce or eliminate the exposure of that portion of the food item to the liquid in the liquid bath. This will result in uneven thawing at or near the top of the food item (i.e., that portion of the food item covered by the weighted item). Another problem with use of a weighted item to "hold down" a buoyant food item in a liquid bath is that the weighted item is very likely to push the food item down against the bottom surface of the sink, pan or other enclosure containing the liquid bath. With the lower side of the food item pressed against the bottom surface of the of the enclosure by the weighted item, the food item is further not encircled by the liquid in the liquid bath, resulting in more uneven defrosting of the food item. As stated above, the uneven defrosting of food items is not preferred or recommended.

With regard to the prior art, there have not been many apparatuses or devices for assisting persons with more evenly defrosting a food item in a liquid bath. One such apparatus is U.S. Publication No. 2015/0282517 to Williams, which describes a utensil for retaining an object in a liquid bath having a core portion with at least two arms extending outward from the core to define a restraint for retaining the object in the liquid bath in a submerged condition, an anchor at the lower end of the core portion for securing the core portion to the container containing the liquid bath and at least one stabilizing member that has a base which is configured and positioned to counteract the upward force exerted by the object under the arms. Each of the arms are bent downward at the distal end to form a finger which is configured to prevent the object from shifting outwardly away from the core portion of the apparatus. Arms that are adjacent to each other form an acute angle. In certain embodiments, the core portion is hollow, the arms are formed with a bend that is towards the core portion and/or the arms and/or the anchor is detachable from the core portion. In one embodiment the anchor is a suction cup. In other embodiments, the anchor can comprise hook-and-loop material, magnets and the like. The arms of the utensil must be sufficiently stiff and long enough to hold the food item under the arms and, therefore, under the surface of the water. There appears to be very little or no flexibility in the outwardly extending arms, particularly independent flexibility or movement, with regard to being able to retain food items of different sizes and dimensions.

Despite the prior art, what is needed is an improved apparatus for holding an object in a liquid bath. More specifically, what is needed is an improved apparatus for removably holding a buoyant object, such as a frozen food item, in a liquid bath, such as a sink, pot or other container having water inside the interior chamber thereof. The new apparatus should have one or more engaging devices that are configured to engage the bottom surface of the container so as to secure the apparatus inside the container. The new apparatus should be structured and arranged to hold an object in the liquid bath in a manner that retains the entire object below the surface of the liquid in the liquid bath. Preferably, the apparatus will hold the object in the liquid bath such that the object will float above the bottom surface of the container so the liquid will be more likely to substantially encircle the object, which in one use of the apparatus will facilitate even defrosting of a frozen food item. The new apparatus should also be configured to minimize contact with object while the apparatus holds the object in the liquid bath in order to reduce the likelihood of any significant portions of the object being covered by the apparatus, which could lead to uneven defrosting when the apparatus is utilized to defrost a frozen food item. In the preferred embodiments, the new apparatus should be easy to use, adaptable to a wide range of objects and relatively inexpensive to manufacture.

SUMMARY OF THE INVENTION

The new apparatus for holding an object in a liquid bath of the present invention provides the benefits and solves the problems identified above. That is to say, the new object holding apparatus of the present invention is structured and arranged for removably holding a buoyant object, such as a frozen food item, in a liquid bath, such as a sink, pot or other container having water inside the interior chamber thereof. The new apparatus has one or more engaging devices, such as suction cups or the like, that are configured to engage the bottom surface of the container to secure the apparatus inside the container. The apparatus of the present invention is structured and arranged to hold an object in the liquid bath in a manner that retains the entire object below the surface of the liquid in the liquid bath but above the bottom surface of the liquid bath container. The new apparatus is configured to minimize contact with an object while holding the object inside the liquid bath. The minimal contact with the object reduces the likelihood that any significant portion of the object will be covered by the apparatus, thereby reducing the likelihood of uneven defrosting when the apparatus is utilized to defrost a frozen food item. In one of the preferred configurations, the new apparatus has a base with a plurality of upwardly and outwardly extending flexible arms that allow the user to independently adjust the position of the arms so as to best hold the object in the liquid bath so the object will float above the bottom wall of the container and below the surface of the liquid in the container so the liquid will be more likely to substantially encircle the object. In one use, the new apparatus facilitates even defrosting of a frozen food item. In the preferred embodiments, the new apparatus is easy to use, adaptable for use with a wide range of objects (including different sizes and configurations of food items) and relatively inexpensive to manufacture.

In one embodiment of the present invention, the new apparatus for holding an object in a liquid bath, made up of a liquid in a container, generally comprises a base, one or more surface engaging devices and one or more independently movable flexible arms. The base has a top surface, a bottom surface and a peripheral edge and it is sized and configured to be placed in the interior chamber of a container that holds the liquid portion of the liquid bath. The surface engaging devices are attached to or integrally formed with the base and are configured to removably secure the base to bottom wall and/or sidewalls of the container. The independently movable, elongated flexible arms are attached to or integral with the base so as to extend upward and outward from the base. Each of the flexible arms has a proximal end at the base and a distal end in spaced apart relation to the base. The flexible arms are structured and arranged to be placed into any desired configuration so as to engage the object and hold the object below the surface of the liquid and in spaced apart relation to the bottom wall and the sidewalls of the container when the buoyant object is in a floating condition in the liquid to define a plurality of liquid areas around the object that at least substantially encircle the object with the liquid. As such, the liquid will be able to contact virtually all of the surface of the object to faster and more evenly treat or process (including defrosting) the object.

In one embodiment, the base has an inside edge that defines a drain opening in the base that is sized and configured to allow access to a drain associated with the container (such as a sink). In this configuration, the base has an outer ring-portion that is defined between the peripheral edge and the inside edge of the base. To better facilitate contact between the surface engaging devices and the bottom wall of the container, the bottom surface of the base can be sloped in a manner that is at least substantially in corresponding relation to the sloped bottom wall of the container. With the surface engaging devices being positioned on the sloped base, the bottom surface of the surface engaging devices will fully engage the bottom wall of the container to better secure the base to the container. In this embodiment, the surface engaging devices are positioned on the bottom surface of the base so as to allow the user to position the drain opening at least generally over the container's drain with the surface engaging devices being disposed around the drain.

In the preferred configurations, the apparatus comprises a plurality of the surface engaging devices, which may be suction cups, magnets or the like, that are attached to or integrally formed with the bottom surface of the base. In one embodiment, the proximal end of the flexible arms are fixedly associated with the top surface of the base. For ease of manufacture, the apparatus can have a plurality of flexible arms that comprise at least two adjacent flexible arms and an enclosed portion that connects the two adjacent flexible arms, with the enclosed portion being embedded in the base generally between the top surface and the bottom surface of the base. In another embodiment, the proximal end of the flexible arms are removably attached to the base.

Accordingly, the primary object of the present invention is to provide a new apparatus for holding an object in a liquid bath that has the advantages set forth above and which overcomes the disadvantages and limitations that are associated with presently available apparatuses for holding objects in a liquid bath.

It is an important object of the present invention to provide a new object holding apparatus that is structured and arranged for removably holding a buoyant object in a liquid bath in a manner that holds the object below the surface of the liquid and above the bottom wall of the container to which the apparatus is removably attached and in which the liquid bath is retained so as to fully immerse and encircle the object with the liquid.

An important aspect of the present invention is that it provides a new object holding apparatus that accomplishes the objectives set forth above and elsewhere in the present disclosure.

Another important aspect of the present invention is that it provides a new object holding apparatus that is structured and arranged for removably holding a buoyant object, such as a frozen food item or the like, in a liquid bath comprising a liquid, which may be water, that is contained in the interior chamber of a sink, pot or other container.

Another important aspect of the present invention is that it provides a new object holding apparatus that has one or more engaging devices, such as suction cups, magnets or the like, that are configured to engage the bottom wall of the container to secure the apparatus inside the container.

Another important aspect of the present invention is that it provides a new object holding apparatus that is configured to minimize contact with the object while the apparatus holds the object inside the liquid bath to reduce the likelihood that any significant portion of the object will be covered by or be in significant contact with the apparatus in order to prevent uneven defrosting when the apparatus is utilized to defrost a frozen food item.

Another important aspect of the present invention is that it provides a new object holding apparatus having a base with a plurality of upwardly and outwardly extending, independently moveable flexible arms that allow the user to independently adjust the position of the arms so as to best hold the object in the liquid bath in a manner which allows the object to float above the bottom surface of the container and below the surface of the liquid in the container, thereby ensuring the liquid bath will substantially encircle the object.

Another important aspect of the present invention is that it provides a new object holding apparatus that facilitates more even defrosting of a frozen food item in a liquid bath.

In yet another important aspect of the present invention, the new object holding apparatus is easy to use, readily adaptable to a wide range of objects (including different sizes and configurations of food items) and relatively inexpensive to manufacture.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new apparatus of the present invention, as well as objects with which the new apparatus can be utilized, those skilled in the art will readily appreciate that the present invention is not so limited. In addition, the exemplary embodiment of the present apparatus is shown and described herein with only those components that are required to disclose the present invention. As such, many of the necessary mechanical elements for combining components together and for using the present invention are not shown or necessarily described below, but which are well known to persons who are skilled in the relevant art. As will be readily appreciated by such persons, the various elements of the present invention that are described below may take on any form consistent with forms that are readily realized by a person of ordinary skill in the art having knowledge of holding apparatuses and items that are or may be utilized with food objects and the like.

Figure 1:
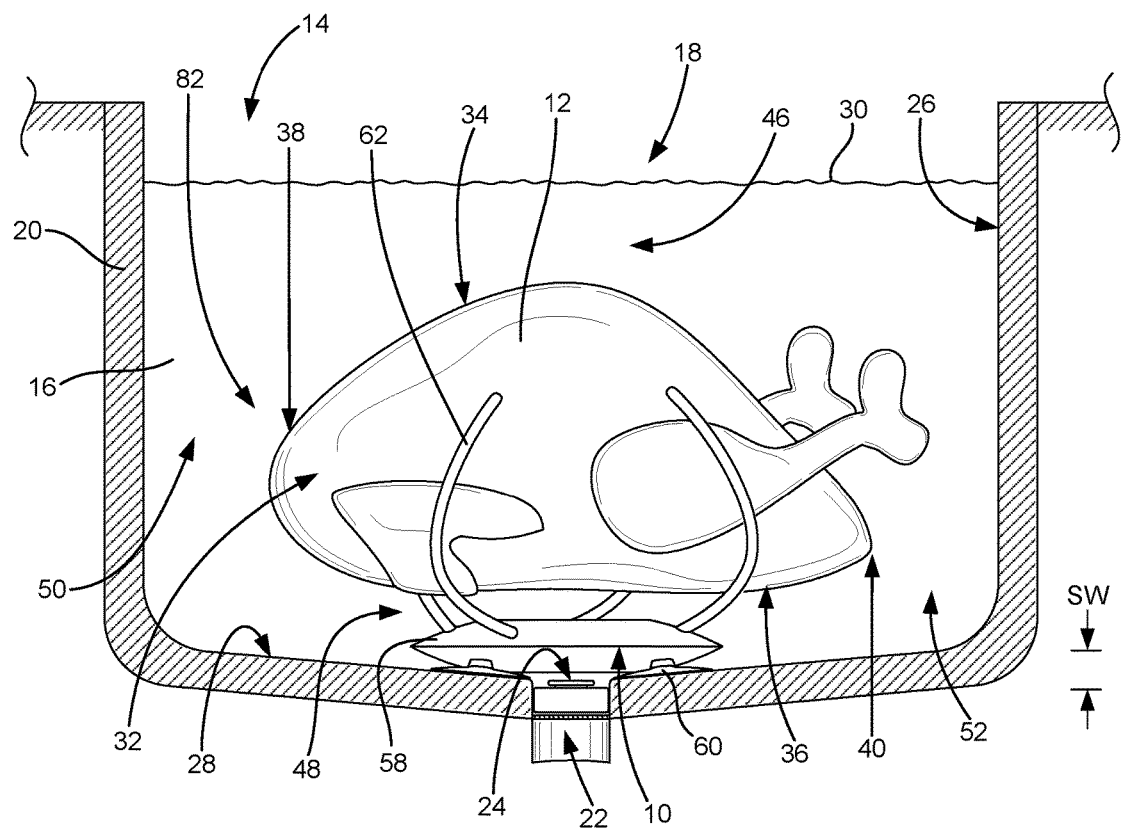
FIG. 1 is a front view of an object holding apparatus that is configured according to a first embodiment of the present invention shown in use holding a turkey inside of a cross-sectional representation of a sink retaining water, with the water shown substantially encircling the turkey.
Figure 2:
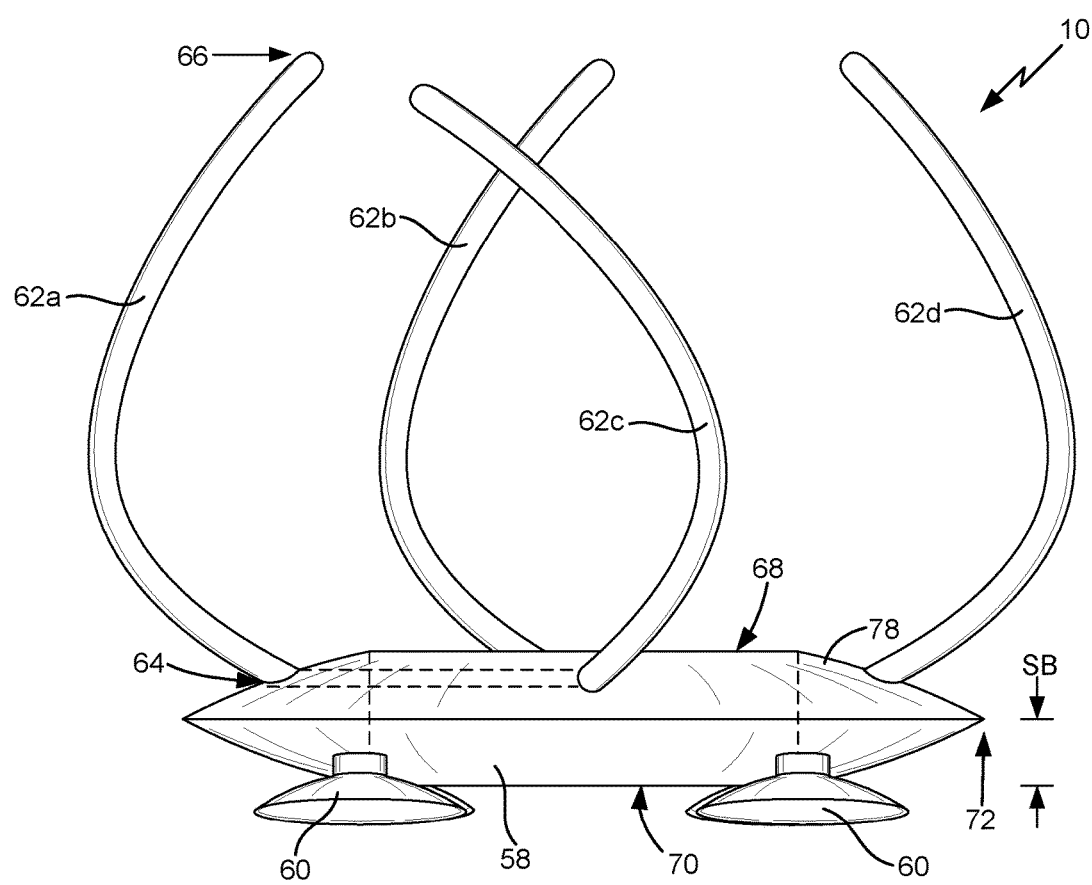
FIG. 2 is a front view of the object holding apparatus of FIG. 1.
Figure 7:
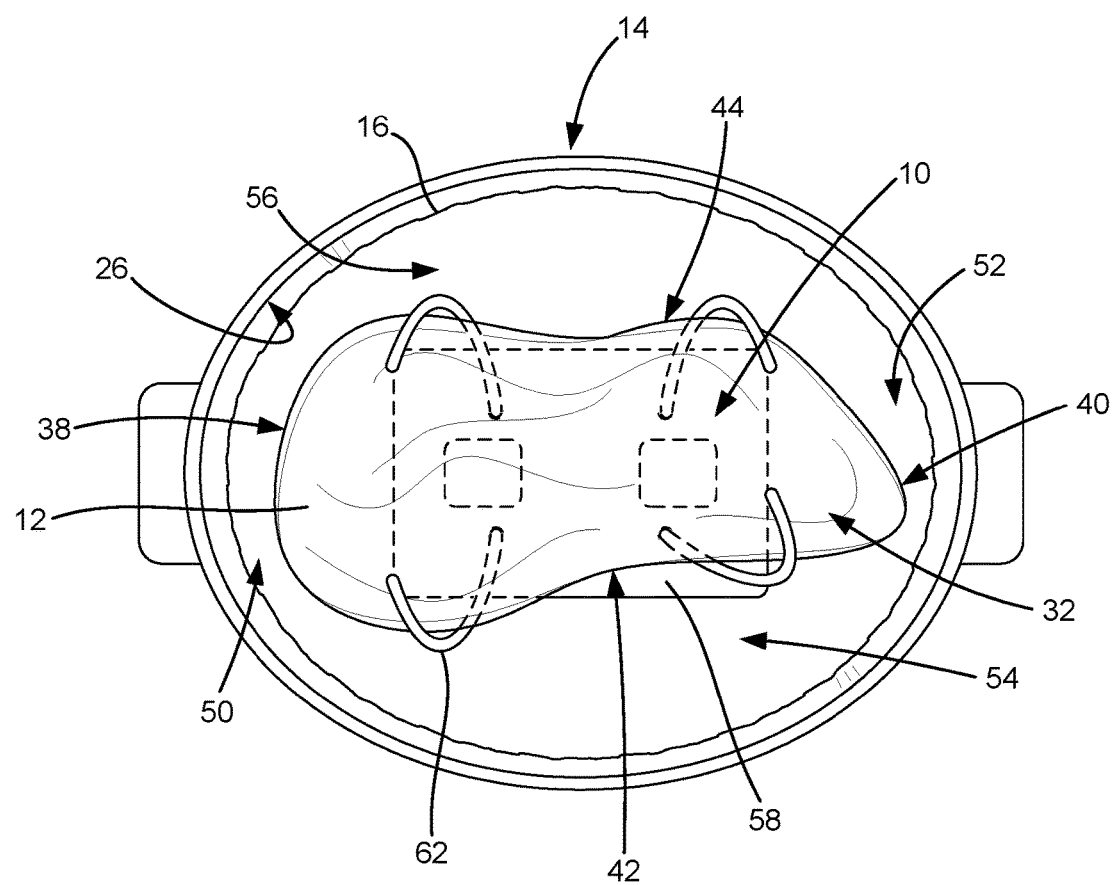
FIG. 7 is a top view of the object holding apparatus of FIG. 5 shown in use to hold a frozen steak in a liquid bath comprising water in a pot, with the water shown substantially encircling the steak.

A holding apparatus that is configured pursuant to one of the preferred embodiments of the present invention is referred to generally as 10 in the figures. As shown in FIG. 1, the new holding apparatus 10 of the present invention is utilized to hold an object 12 in a liquid bath 14 comprising a liquid 16 being retained in the interior chamber 18 of a container 20 so the liquid 16 may act on the object 12 in a manner that is desired by the user. In one use, the new apparatus 10 can be utilized to hold a frozen food item (as the object 12), such as the frozen turkey in FIG. 1 or the frozen steak in FIG. 7. In the examples of FIGS. 1 and 7, the objects 12 are being held in the liquid bath 14, with the liquid 16 being water and the container 20 being a kitchen sink (FIG. 1) or a pot (FIG. 7), in order to defrost the objects 12 in a manner that provides relatively quick but even defrosting of the objects 12. As set forth in the Background with regard to defrosting frozen food items, it is important that the liquid 16 in the liquid bath 14 substantially envelope or encircle (i.e., to completely surround) the food item, including having liquid 16 above, below and all sides of the food item, so that as much of the various surfaces of the frozen food item will be in direct contact with the liquid 16 during the defrosting process. One advantage of defrosting a frozen food item in a sink, as shown with regard to FIG. 1, is that the water (or other liquid 16) in the sink can be allowed to exit out of the sink through a drain 22, which is closed with a drain cover 24 so that the water will accumulate in the sink and fully cover the frozen food item or other object 12.

In general, a container 20 for use with the holding apparatus 10 of the present invention will have one or more sidewalls 26 and a bottom wall 28, as shown in FIGS. 1 and 7, that will form the interior chamber 18 in which the liquid 16 is contained to act on the object 12 in the manner desired by the user of the new apparatus 10. In some uses of apparatus 10, it may be desired for the container 20 to also have a top wall or lid (not shown) that encloses the liquid 16. The liquid 16 in container 20 will form a liquid surface 30, as shown in FIG. 1, at a level selected by the user when adding the liquid 16 to the interior chamber 18 of the container 20. The object 12 will have a surface 32, shown in FIGS. 1 and 7, that will be in contact with the liquid 16 while the object 12 is in the liquid bath 14. For many objects 12, such as a frozen food item (i.e., the frozen turkey shown in FIG. 1 or the frozen steak shown in FIG. 7), it is very highly desired that the liquid 16 of the liquid bath 14 be in full contact with the surface 32 of the object 12. Typically, the surface 32 of the object 12 that is desired to be acted on by the liquid 16 includes all sides of the of object 12, shown in FIGS. 1 and 7 as the top side 34, bottom side 36, left side 38, right side 40, front side 42 and back side 44. When using the apparatus 10 to hold an object 12 in the liquid bath 14 to fully encircle the object 12 (such as when defrosting a frozen food item), the liquid surface 30 will be above the top side 34 of the object 12, as shown in FIG. 1. When the liquid 16 is fully encircling the object 12, as typically desired, there will be areas of liquid 16 on each of the sides 34/36/38/40/42/44 of the object 12, such as the upper liquid area 46 between the liquid surface 30 and the top side 34 of the object 12, the lower liquid area 48 between the bottom surface 28 of the container 20 and the bottom side 36 of the object 12 and the first side liquid area 50, second side liquid area 52, third side liquid area 54 and the fourth side liquid area 56 between, respectively, the left side 38, right side 40, front side 42 and back side 44 of the object 12 and the sidewalls 26 of the container 20, as shown in FIGS. 1 and 7. As set forth in more detail below, the apparatus 10 of the present invention is structured and arranged to hold the object 12 in the liquid bath 14 in a manner that defines the above-described liquid areas 46/48/50/52/54/56 around the object 12 so as to completely encircle the object 12 with liquid 16 in the container 20.

The holding apparatus 10 of the present invention generally comprises a base 58, one or more surface engaging devices 60 for removably attaching the base 58 to the container 20 (typically the bottom wall 28 thereof) and one or more outwardly extending flexible arms 62 that are attached to or integral with the base 58, as best shown in FIGS. 2-6. In a typical configuration, the apparatus 10 will have a plurality of flexible arms 62 that extend upward and outward from the base 58, such as the first flexible arm 62a, second flexible arm 62b, third flexible arm 62c and fourth flexible arm 62d shown in the figures. Each of the flexible arms 62 has a first or proximal end 64 at the base 58 and a second or distal end 66 in spaced apart relation to the base 58, as shown in FIGS. 2-6. As shown in FIGS. 1 and 7 and set forth in more detail below, in one embodiment, the surface engaging devices 60 hold the base 58 in place against the bottom wall 28 of the container 20 and the flexible arms 62 are manipulated by the user to engage the object 12 in a manner that allows the object 12 (when object 12 is buoyant—such as frozen foods) to float in the liquid 16 below the liquid surface 30 and in spaced apart relation to the sidewalls 26 and bottom wall 28 of the container 20 so as to define the liquid areas 46/48/50/52/54/56 around the object 12 so as to completely encircle the object 12 with liquid 16 in the container 20.

The base 58 of the apparatus 10 has an upper surface 68, a lower surface 70 and an outer peripheral edge 72, as best shown in FIGS. 2-6. The base 58 may be made out of a wide variety of materials and in virtually any size and shape that may be desired by the user, including the round and square shapes shown in the figures. In a preferred configuration of the apparatus 10, the base 58 is made out of a material that will not rust or otherwise corrode in the liquid 16 with which it will be utilized. For use with food items, such as the frozen turkey or steak shown in FIGS. 1 and 7, it is likely to be preferred to make the base out of a food grade material, such as non-BPA silicone, stainless steal or the like. For many uses, the softer silicone material may be preferred so as to reduce the likelihood of scratching or otherwise damaging the sidewalls 26 or bottom wall 28 of the container 20. Preferably, the material will be suitable for use in, at least relatively, warm or hot liquids 16 and will be able to be cleaned using commonly available cleaning fluids and techniques, including being dishwasher friendly. The base 58 should be sized and configured to be large enough to secure the object 12 in place in the liquid bath 14, yet be able to easily fit inside the interior chamber 18 of the typical containers 20 with which the apparatus 10 will be utilized (i.e., such as a standard sink, pot, pan or the like). In one configuration, the base 58 has a diameter or width of approximately five to seven inches.

Figure 3:
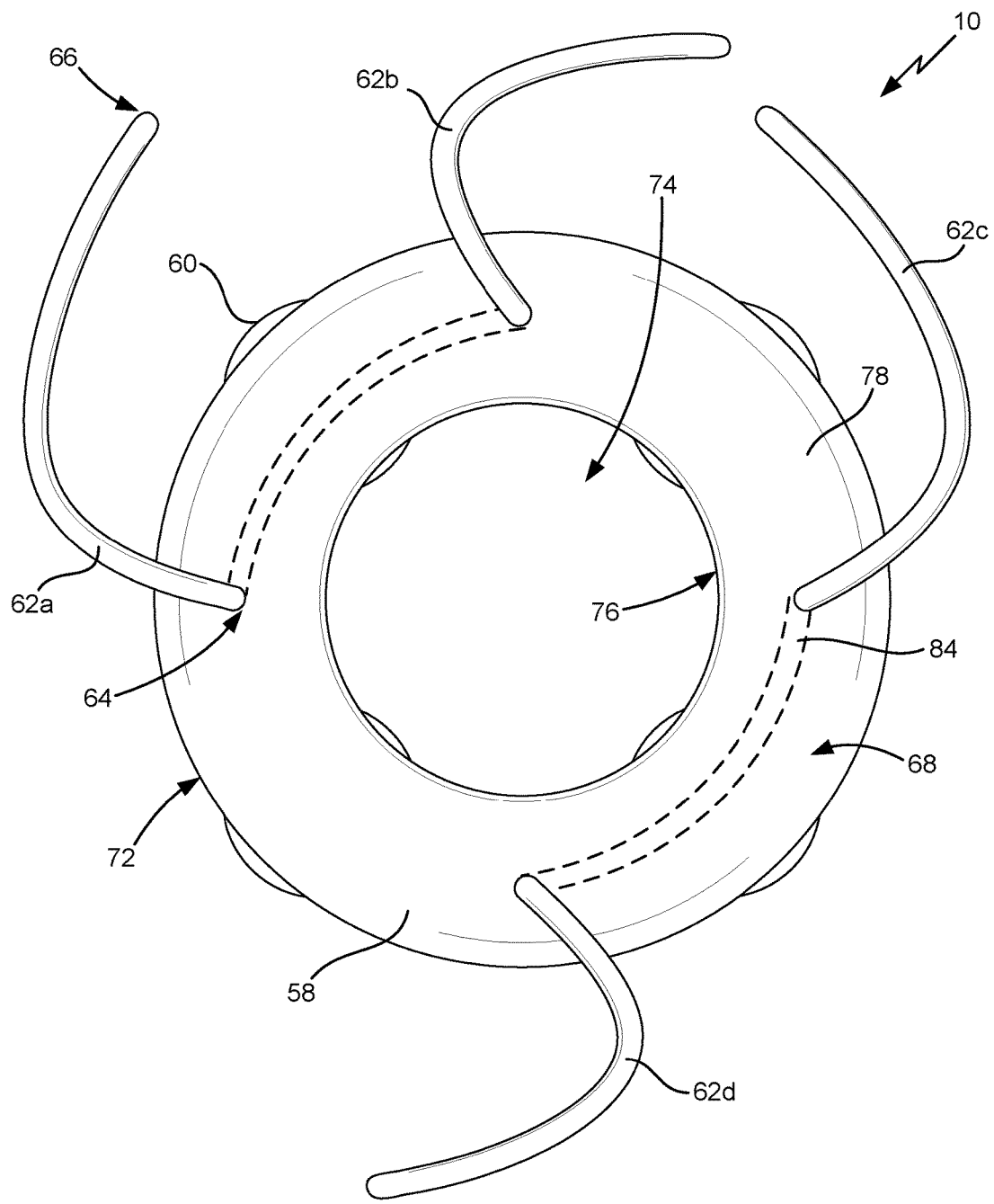
FIG. 3 is a top view of the object holding apparatus of FIG. 2.
Figure 4:
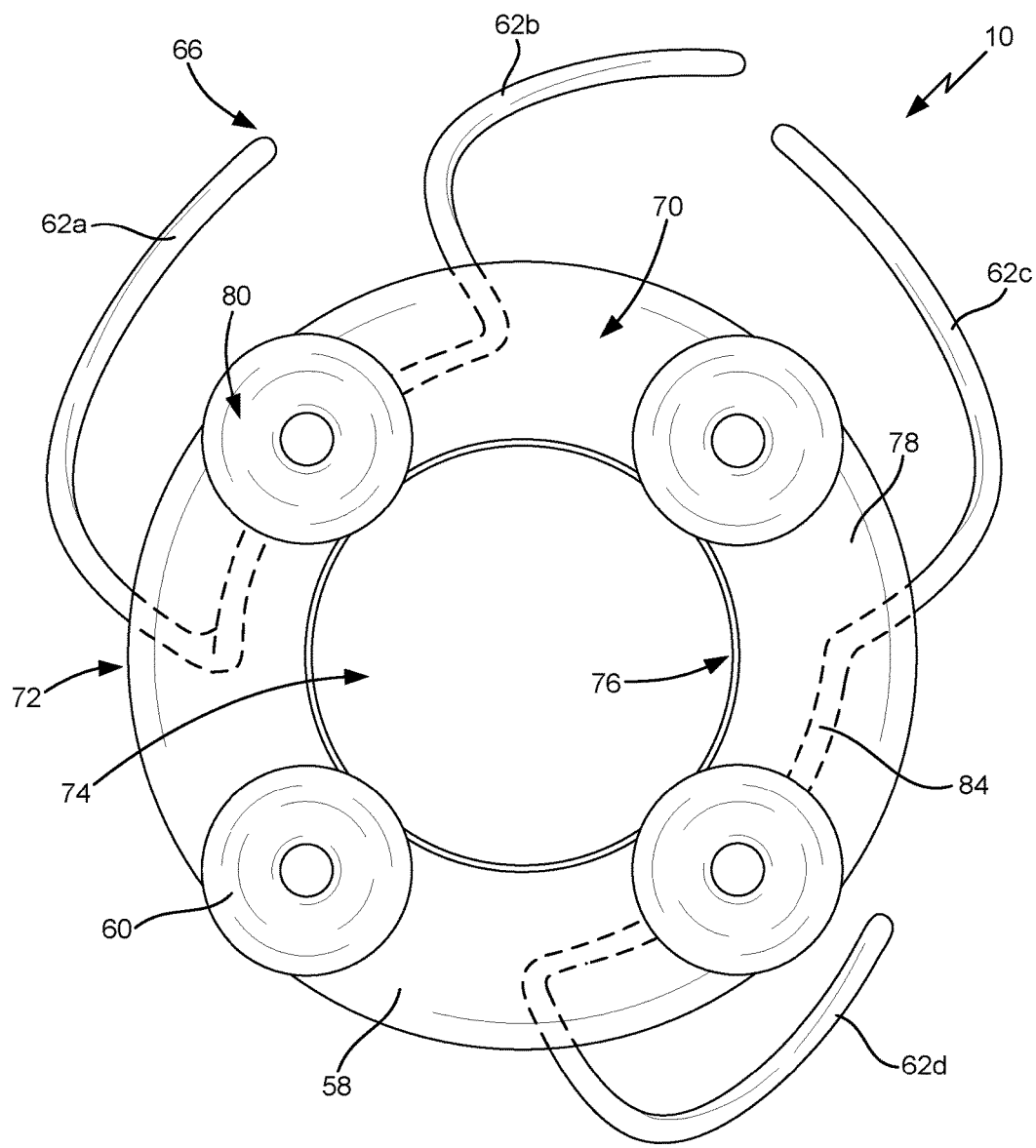
FIG. 4 is a bottom view of the object holding apparatus of FIG. 2.

In an embodiment where the apparatus 10 is particularly configured for use with a sink (as the container 20) having a drain 22 through which the liquid 16 can be discharged, the base 58 has a drain opening 74, which is defined by an inside edge 76, that is sized and configured to allow the user to access the drain cover 24. Preferably, opening 74 is sized and configured so the user can remove the drain cover 24, or at least slide it aside, so that the liquid 16 in the container 20 can exit through the drain 22. If desired, the user then can place the drain cover 24 back in position, or slide it back, over the drain 22 and refill the container 20 with fresh liquid 16. In one configuration, the inside edge 76 is round, as shown in FIGS. 3 and 4, and has a diameter of approximately three to four inches. In this embodiment, the base 58 is ring-shaped, defining the outer ring-portion 78 shown in FIGS. 2-4, that is formed between the peripheral edge 72 and the inside edge 76 of the base 58. As will be readily appreciated by persons skilled in the art, the outer ring-portion 78 can be of virtually any shape (i.e., round, oval, rectangular, square or etc.). Preferably, the outer ring-portion 78 is relatively narrow so that the apparatus 10 can be utilized with sinks (as container 20) where the drain 22 is located relatively close to one of the sidewalls 26 (often the back sidewall) of the sink and the drain opening 74 of the base 58 will still be able to fit around the drain 22. In one configuration, the outer ring-portion 78 of the base 58 is approximately an inch in width. The outer ring-portion 78 of the base can have an angled or sloped bottom surface 70 (with the angle represented by the sloped base SB in FIG. 2) that is, at least substantially, in corresponding relation to the angle of the sloped bottom wall 28, which angle being shown as sloped wall SW in FIG. 1. As well known in the art, the sloped wall SW of the sink is provided to better facilitate drainage of liquid 16 from the interior chamber 18 into the drain 22. The sloped base SB of the base 58 is provided to obtain better contact between the surface engaging devices 60 and the bottom wall 28 of the sink (or other container 20 having a sloped bottom wall 28). With regard to the figures, both the sloped base SB and the sloped wall SW are, likely, exaggerated in the amount of sloping so as to better illustrate this feature.

Figure 5:
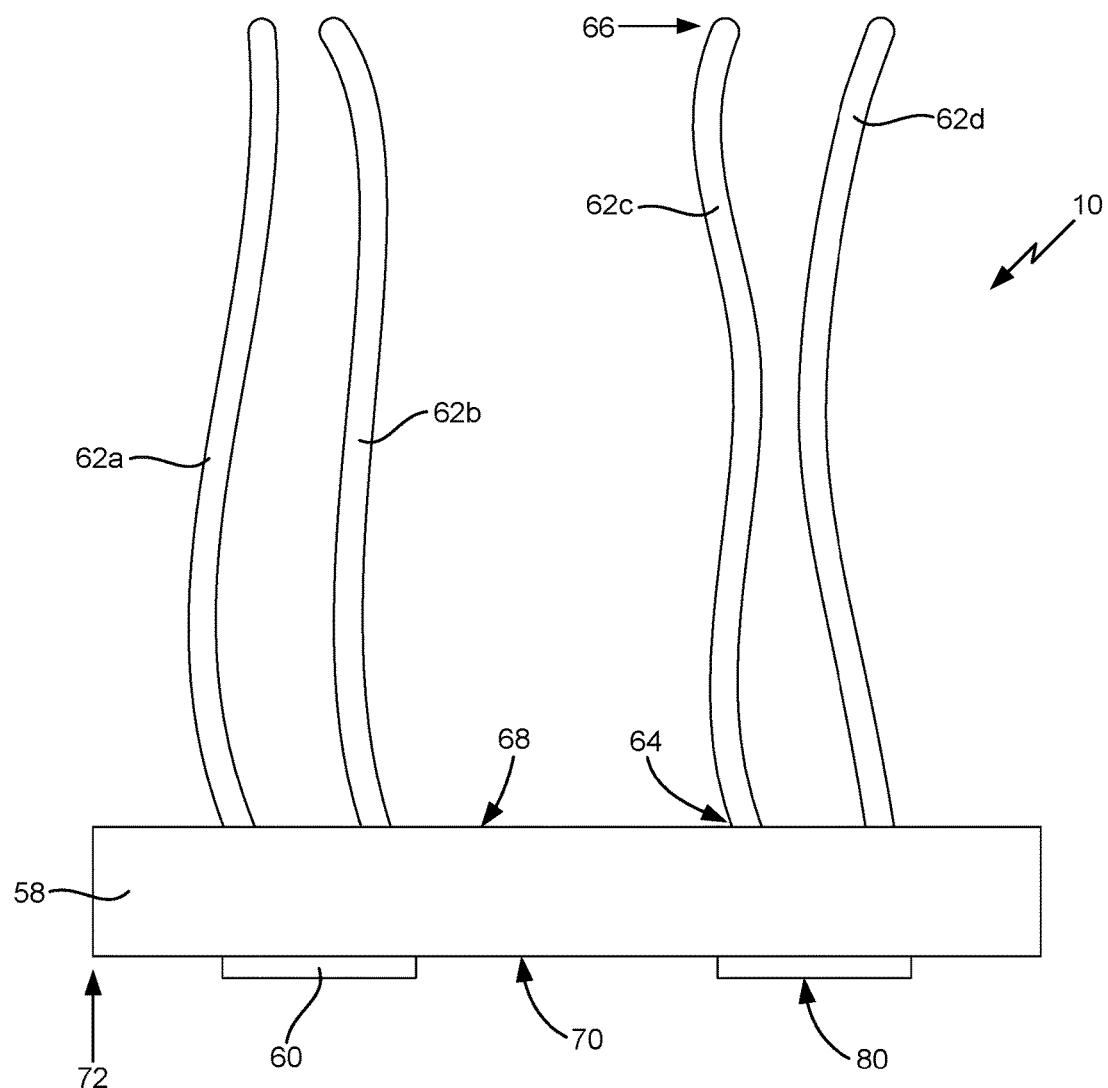
FIG. 5 is a front view of an object holding apparatus that is configured according to a second embodiment of the present invention showing use of removable arms to hold the object and magnets to secure the apparatus to the container.
Figure 6:
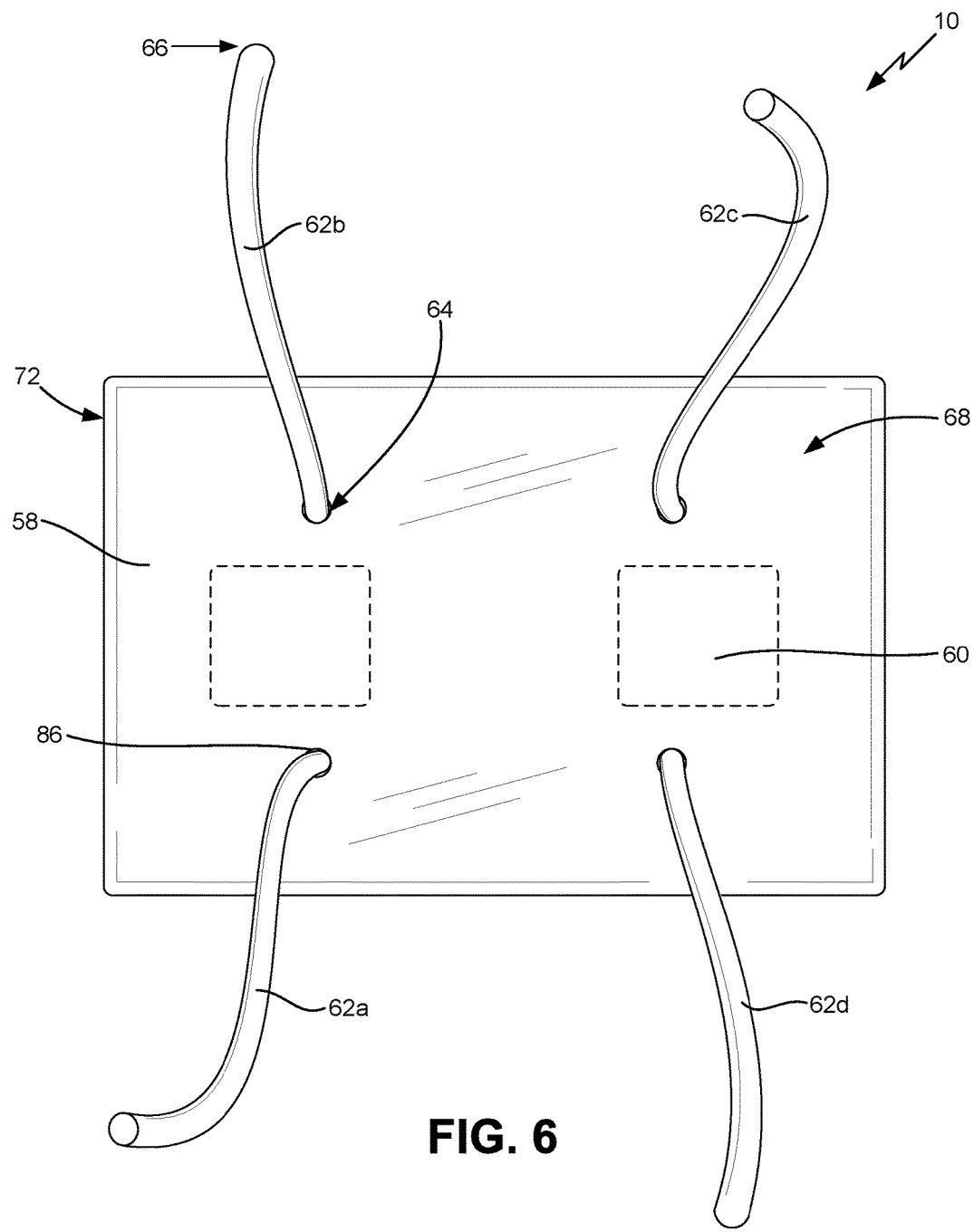
FIG. 6 is a top view of the object holding apparatus of FIG. 5.

As set forth above, one or more surface engaging devices 60 are utilized to engage one of the walls of the container 20, typically the bottom wall 28, to secure the apparatus 10 in the interior chamber 18 of the container 20. The surface engaging devices 60 will hold the apparatus 10 in place away from the sidewalls 26 of the container 20 (i.e., typically centered at or near the center of the container 20) and will prevent the apparatus 10 from floating upward with the buoyant object 12, such as the frozen turkey or steak shown in FIGS. 1 and 7. In the embodiment of FIGS. 1-4, the surface engaging devices 60 are suction cups that are sized and configured to hold the base 58 of the apparatus 10 to the bottom wall 28 (typically) of the container 20. The surface engaging devices 60 have a bottom surface 80 that is selected to securely attach the base 58 to the container 20. The configuration and use of suction cups as surface engaging devices 60 are generally well known in the art. In the embodiment of FIGS. 5-7, the surface engaging devices 60 are magnets. As will be readily appreciated by persons skilled in the art, suction cups will be able to attach to most materials, whereas the magnets will require the container 20, or at least the relevant portion thereof (either the sidewalls 26 or the bottom wall 28), be made out of a ferromagnetic material, such as iron or steel. As will also be readily appreciated by persons skilled in the art, a variety of other devices can be utilized as the surface engaging devices 60 for the apparatus 10 of the present invention.

The flexible arms 62, which are attached to or integral with the base 58, extend generally outwardly from the base 58 to engage the object 12 so as to hold the object 12 in a somewhat floating condition 82 below the liquid surface 30 of the liquid 16 in the container 20. In the preferred configuration, the flexible arms 62 are elongated and of sufficient length to be able to engage a wide variety of objects 12. In one embodiment of the apparatus 10 of the present invention, the length of the flexible arms 62 between the proximal 64 and distal end 66 thereof is approximately six to eight inches. The flexible arms 62 are independently movable (i.e., can be stretched, bent, twisted and etc.) and sufficiently flexible to allow the user to relatively easily bend the flexible arms 62 into a nearly infinite variety of different configurations to contact and then hold the object 12 in the liquid 16 with the desired liquid areas 46/48/50/52/54/56 around the object 12 so the liquid 16 will completely encircle the object 12, as shown in FIGS. 1 and 7. In a preferred configuration, the proximal ends 64 of each of the flexible arms 62 are located in spaced apart relation to each other. The distal ends 66 of the flexible arms 62 should be at least somewhat smooth so as to not penetrate or otherwise damage the object or damage the container 20. To hold the object 12 in place, the material or materials selected for the flexible arms 62 should be also sufficiently inelastic (plastic) that the flexible arms 62 will retain their shape and position imposed upon the flexible arms 62 by the user when positioning the flexible arms 62 around the object 12. A wide variety of elongated wire or wire-like materials can be utilized for the flexible arms 62. In a preferred embodiment, the wire or wire-like component of flexible arms 62 are made from, coated or otherwise covered with a material that will not scratch or otherwise damage the sidewalls 26 or bottom wall 28 of the container 20 and will not harm the object 12. In one of the preferred embodiments of the present invention, the flexible arms 62 have a silicone covered outer surface (as well known, the use of silicone makes the item food safe and easy to clean). Alternatively, various rubber or plastic materials can be utilized to cover the wire or wire-like component, which provides the stiffness, of the flexible arms 62.

The independently movable, elongated flexible arms 62 can have a round, square, rectangular or variety of other shapes. In one embodiment, the flexible arms 62 have a round shape to facilitate bending in any direction. In another embodiment, the flexible arms 62 have a relatively flat shape to facilitate bending in an up/down direction but not so much in a left/right direction. The flexible arms 62 should be made out of materials that will allow them to be bent, straightened and bent/straightened repeatedly over the anticipated life of the use of the apparatus 10. The flexible arms 62 can be provided with small indentions or other features along the length of the flexible arm 62 to reduce the likelihood of the flexible arms 62 being worn out (broken) from repeated bending. The indentions or other features can also be utilized to improve the user's grip of the flexible arms 62.

In one embodiment of the apparatus 10 of the present invention, the flexible arms 62 are formed with the base 58 so as to be substantially integral therewith (i.e., not removable from the base 58). In one configuration, the base 58 is formed around the proximal end 64 of each flexible arm 62 to secure the flexible arms 62 to the base 58. In another configuration, which is shown in FIGS. 1-4, the base 58 is made from two separate base pieces (such as by molding) and each pair of flexible arms 62 is formed from a single elongated component that has an enclosed portion 84 which is trapped between the two separate base pieces that joins two adjacent flexible arms 62 together (such as flexible arms 62a/62b and flexible arms 62c/62d). In a preferred embodiment, the base pieces can be the same (i.e., duplicate of each other) to reduce the cost of manufacturing the base 58. With the two base pieces joined together, typically using adhesive, sonic welding or the like, trapping the enclosed portion 84 in the base 58 with the flexible arms 62 extending outward from the base 58. In yet another configuration, which is shown with regard to the embodiment of FIGS. 5-7, the flexible arms 62 can be removably attached to the base 58. In this configuration, the base 58 is provided with a plurality of arm apertures 86, best shown in FIG. 6, that are cooperatively sized and configured with the proximal ends 64 of the flexible arms 62 such that one (typically) proximal end 64 can be securely received into one of the arm apertures 86 to securely engage the flexible arms 62 with base 58. Alternatively, more than one flexible arm 62 can be received into each of the arm apertures 86. In either configuration, once the flexible arms 62 are received into the arm apertures 86 the flexible arms 62 should, effectively, become one with the base 58 during use of the apparatus 10. A wide variety of different configurations can be utilized for the proximal ends 64 and the arm apertures 86. Removable flexible arms 62 could, depending on several factors, reduce the cost of manufacturing the apparatus 10. In addition, removable flexible arms 62 can allow the user to select the length of the flexible arms 62 which is best suited to the container 20 in which he or she will be using to treat (i.e., defrost) the object 12 with the liquid 16 portion of the liquid bath 14.

The embodiment of FIGS. 1-4, the apparatus 10 is shown with a round shape having an outer ring-portion 78 that has a sloped base SB that is at least in general corresponding relation with the sloped wall SW of the bottom wall 28 of the container 20 (such as a sink) with a plurality of suction cups as the surface engaging devices 60. As will be readily appreciated with suction cups, although the base 58 could be secured to the bottom wall 28 of the container 20 without the sloped base SB (i.e., having a flat bottom surface 70), the use of the sloped base SB is likely to provide more secure contact between the bottom surface 80 of the suction cups than if the bottom surface 70 of the base was flat. The drain opening 74 in the base 58 allows access to drain cover 24 and drain 22. The embodiment of FIGS. 5-7 show the use of a square base 58 having a pair of magnets, as the surface engaging devices 60, that are attached to the bottom surface 70 of the base 58 and selected to magnetically engage the bottom wall 28 of a pot, pan or like containers 20.

As will be readily appreciated by persons skilled in the relevant art, the above-described shapes, dimensions, materials and use of suction cups, magnets, wires and the like are for exemplary purposes only and are not intended to limit the overall scope of the present invention. As will also be readily appreciated by such persons, a wide variety of alternative configurations could be used for the various components of the apparatus 10 of the present invention. For instance, the surface engaging devices 60 could be sized and configured to attach to the sidewalls 26 or to both the sidewalls 26 and bottom wall 28 of the container 20. In another possible alternative configuration, the apparatus 10 could have more than one type of surface engaging device 60, such as having a combination of suction cups and magnets (or other devices).

In use, the user will place the apparatus 10 in the container 20 he or she wishes to utilize to treat or otherwise process the object 12 and secure the surface engaging devices 60 to the bottom wall 28 (typically) of the container 20. For the suction cups, this will require slightly pressing downward on the base 58 to engage the suction cups with the bottom wall 28. For the magnets, merely placing the magnets in contact with the bottom wall 28 will suffice. Once the apparatus 10 is in place, the user can manipulate the flexible arms 62 to at least generally be in the configuration desired to secure object 12 in place when the liquid 16 is added to the container 20. Water or other liquid 16 is then placed the interior chamber 18 of the container 20 to the level that will be needed to cover the object 12, creating the liquid bath 14 having the liquid surface 60. Although the liquid 16 can be placed in the interior chamber 18 before the apparatus 10 is in place and/or the flexible arms 62 are manipulated, this would require the user to place his or her hands into the liquid 16 to engage the surface engaging devices 60 with the bottom wall 28 of the container 20 or manipulate the flexible arms 62. Once the liquid 16 is in the container 20, the object 12 is placed in the general vicinity of the flexible arms 62 and the flexible arms 62 are again manipulated to engage the buoyant object 12 and hold the object 12 below the liquid surface 30 and away from the sidewalls 26 and bottom wall 28 of the container 20. Once the flexible arms 62 engage the object 12, the object 12 can be left in the liquid 16 until it is processed as desired by the user. As will be readily appreciated by persons skilled in the art, apparatus 10 of the present invention is easy to use, adaptable to a wide range of different types and sizes of objects and relatively inexpensive to manufacture.

When utilized to defrost a frozen food item (as the object 12), the apparatus 10 of the present invention will hold the object 12 in the liquid 16 with the desired liquid areas 46/48/50/52/54/56 all around the object 12 so the liquid 16 will at least completely encircle the object 12, as shown in FIGS. 1 and 7. Unlike prior art apparatuses and methods for defrosting frozen food items, the apparatus 10 of the present invention is configured to minimize contact with the object 12 while the apparatus 10 holds the object 12 inside the liquid bath 14 so as to reduce the likelihood that any significant portion of the object 12 will be covered by or even in significant contact with the apparatus 10. Fully encircling the object 12 with liquid and reducing contact with the apparatus 10 will help prevent uneven defrosting when the apparatus 10 is utilized to defrost a frozen food item. These features of the apparatus 10 of the present invention are also likely to be beneficial for other uses of apparatus 10 (namely, other than defrosting a frozen food item) to hold an object 12 in a liquid bath 14 so the object 12 may be processed, modified or otherwise affected by the liquid 16.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. An apparatus for holding an object in a liquid bath made up of a liquid disposed in a container having one or more sidewalls and a bottom wall that define an interior chamber of the container, said apparatus comprising:
    a base having a top surface, a bottom surface and a peripheral edge, said base sized and configured for placement in the interior chamber of the container, said base having an inside edge defining a drain opening in said base that is sized and configured to allow access to a drain associated with the container when said apparatus is placed in the interior chamber of the container;
    one or more surface engaging devices attached to or integrally formed with said base, said one or more surface engaging devices configured for removably securing said base to at least one of the one or more sidewalls and the bottom wall of the container, said one or more surface engaging devices comprising at least one of a suction cup and a magnet; and
    one or more independently movable, elongated flexible arms attached to or integral with said base so as to extend upward and outward from said base, each of said flexible arms having a proximal end at said base and a distal end in spaced apart relation to said base, said flexible arms structured and arranged for engaging the object and holding the object below a liquid surface of the liquid and in spaced apart relation to the bottom wall and the sidewalls of the container when the object is placed in a floating condition in the liquid bath so as to define a plurality of liquid areas around the object that at least substantially encircle the object with the liquid.

2. The apparatus of claim 1, wherein said base comprises an outer ring-portion defined between said peripheral edge and said inside edge.

3. The apparatus of claim 2, wherein said bottom surface of said base at said outer ring-portion is a sloped base, said sloped base configured so as to be substantially in corresponding relation to a sloped wall of the bottom wall of the container.

4. The apparatus of claim 3, wherein said surface engaging devices are positioned on said sloped base so a bottom surface of said surface engaging devices will fully engage the bottom wall of the container.

5. The apparatus of claim 1, wherein said surface engaging devices are positioned on said bottom surface of said base so as to position said drain opening at least generally over the drain with said surface engaging devices being disposed around the drain when said apparatus is placed in the interior chamber of the container.

6. The apparatus of claim 1, wherein said apparatus comprises a plurality of said surface engaging devices attached to or integrally formed with said bottom surface of said base.

7. The apparatus of claim 1, wherein said proximal end of said flexible arms are fixedly associated with said top surface of said base.

8. The apparatus of claim 7, wherein said apparatus has a plurality of said flexible arms comprising at least two adjacent flexible arms and an enclosed portion interconnecting said adjacent flexible arms, said enclosed portion in said base generally between said top surface and said bottom surface of said base.

9. The apparatus of claim 1, wherein said proximal end of said flexible arms are removably attached to said base.

10. An apparatus for holding an object in a liquid bath made up of a liquid disposed in a container having one or more sidewalls and a bottom wall that define an interior chamber of the container, said apparatus comprising:
 a base having a top surface, a bottom surface and a peripheral edge, said base sized and configured for placement in the interior chamber of the container, said base having an inside edge defining a drain opening and an outer ring-portion of said base, said drain opening being sized and configured to allow access to a drain associated with the container when said apparatus is placed in the interior chamber of the container, said bottom surface of said base at an outer ring-portion being a sloped base, said sloped base configured to be substantially in corresponding relation to a sloped wall of the bottom wall of the container;
 one or more surface engaging devices attached to or integrally formed with said bottom surface of said base, said surface engaging devices configured for removably securing said base to the bottom wall of the container, said surface engaging devices positioned on said sloped base so a bottom surface of said surface engaging devices will fully engage the bottom wall of the container; and
 a plurality of independently movable, elongated flexible arms attached to or integral with said base so as to extend upward and outward from said top surface of said base, each of said flexible arms having a proximal end at said top surface of said base and a distal end in spaced apart relation to said top surface of said base, said one or more flexible arms being structured and arranged for engaging the object and holding the object below a liquid surface of the liquid and in spaced apart relation to the bottom wall and the sidewalls of the container when the object is placed in a floating condition in the liquid bath so as to define a plurality of liquid areas around the object that at least substantially encircle the object with the liquid.

11. The apparatus of claim 10, wherein said surface engaging devices are positioned on said bottom surface of said base so as to position said drain opening at least generally over the drain with said surface engaging devices being disposed around the drain.

12. The apparatus of claim 10, wherein said apparatus comprises a plurality of said surface engaging devices attached to or integrally formed with said bottom surface of said base.

13. The apparatus of claim 10, wherein said proximal end of said flexible arms are fixedly associated with said top surface of said base.

14. The apparatus of claim 13 further comprising at least two adjacent flexible arms and an enclosed portion interconnecting said adjacent flexible arms, said enclosed portion in said base generally between said top surface and said bottom surface of said base.

15. The apparatus of claim 10, wherein said proximal end of said flexible arms are removably attached to said base.

16. An apparatus for holding an object in a liquid bath made up of a liquid disposed in a container having one or more sidewalls and a bottom wall that define an interior chamber of the container, said apparatus comprising:
 a base having a top surface, a bottom surface and a peripheral edge, said base sized and configured to be placed in the interior chamber of the container, said base having an inside edge defining a drain opening and an outer ring-portion of said base, said drain opening being sized and configured to allow access to a drain associated with the container;
 a plurality of surface engaging devices attached to or integrally formed with said bottom surface of said base, said surface engaging devices being configured to removably secure said base to the bottom wall of the container, said surface engaging devices positioned on said bottom surface of said base so as to position said drain opening at least generally over the drain with said surface engaging devices being disposed around the drain; and
 a plurality of elongated flexible arms attached to or integral with said base so as to extend upward and outward from said top surface of said base, each of said flexible arms being independently movable and having a proximal end at said top surface of said base and a distal end in spaced apart relation to said top surface of said base, said one or more flexible arms being structured and arranged to engage the object and hold the object below a liquid surface of the liquid and in spaced apart relation to the bottom wall and the sidewalls of the container when the object is in a floating condition so as to define a plurality of liquid areas around the object that at least substantially encircle the object with the liquid.

17. An apparatus for holding an object in a liquid bath made up of a liquid disposed in a container having one or more sidewalls and a bottom wall that define an interior chamber of the container, said apparatus comprising:

a base having a top surface, a bottom surface and a peripheral edge, said base sized and configured for placement in the interior chamber of the container, said bottom surface of said base at said outer ring-portion being a sloped base, said sloped base configured to be substantially in corresponding relation to a sloped wall of the bottom wall of the container;

one or more surface engaging devices attached to or integrally formed with said base, said one or more surface engaging devices configured for removably securing said base to at least one of the one or more sidewalls and the bottom wall of the container, said surface engaging devices positioned on said sloped base so a bottom surface of said surface engaging devices will fully engage the bottom wall of the container; and a plurality of independently movable, elongated flexible arms attached to or integral with said base so as to extend upward and outward from said base, said plurality of flexible arms comprising at least two adjacent flexible arms and an enclosed portion interconnecting said adjacent flexible arms, said enclosed portion disposed in said base generally between said top surface and said bottom surface of said base, each of said flexible arms having a proximal end at said base and a distal end in spaced apart relation to said base, said flexible arms structured and arranged for engaging the object and holding the object below a liquid surface of the liquid and in spaced apart relation to the bottom wall and the sidewalls of the container when the object is in a floating condition in the liquid bath so as to define a plurality of liquid areas around the object that at least substantially encircle the object with the liquid.

* * * * *